(12) United States Patent
Yanagi

(10) Patent No.: US 7,403,106 B2
(45) Date of Patent: Jul. 22, 2008

(54) SEATBELT APPARATUS

(75) Inventor: Eiji Yanagi, Tokyo (JP)

(73) Assignee: Takata Corporation, Tokyo (JP)

( * ) Notice: Subject to any disclaimer, the term of this patent is extended or adjusted under 35 U.S.C. 154(b) by 195 days.

(21) Appl. No.: 11/276,386

(22) Filed: Feb. 27, 2006

(65) Prior Publication Data

US 2006/0208866 A1   Sep. 21, 2006

(30) Foreign Application Priority Data

Mar. 8, 2005   (JP)   ............................. 2005-064530

(51) Int. Cl.
*B60Q 1/00* (2006.01)
*G08B 21/00* (2006.01)
(52) U.S. Cl. ...................... 340/457.1; 340/650; 340/664
(58) Field of Classification Search ............. 340/457.1, 340/664, 687, 506, 650; 307/10.1; 701/34
See application file for complete search history.

(56) References Cited

U.S. PATENT DOCUMENTS

| | | | |
|---|---|---|---|
| 5,109,199 A * | 4/1992 | Berger ......................... 324/415 |
| 5,590,904 A * | 1/1997 | Ellis et al. ................. 340/457.1 |
| 6,329,893 B1 * | 12/2001 | Furukawa et al. ......... 340/457.1 |
| 6,729,427 B1 * | 5/2004 | Do ........................... 340/457.1 |
| 2003/0117018 A1 * | 6/2003 | Young ....................... 307/10.1 |
| 2004/0239515 A1 | 12/2004 | Marchthaler |

FOREIGN PATENT DOCUMENTS

| | | |
|---|---|---|
| DE | 101 27 058 A1 | 12/2002 |
| GB | 2 390 494 A | 1/2004 |
| JP | 5-15813 | 3/1993 |
| JP | 5-53508 | 7/1993 |
| JP | 2001-211 | 1/2001 |
| JP | 2004-237827 | 8/2004 |

* cited by examiner

*Primary Examiner*—Thomas J Mullen, Jr.
(74) *Attorney, Agent, or Firm*—Foley & Lardner LLP

(57) ABSTRACT

The disclosed detection circuit for a seatbelt apparatus may include an attachment detection switch, first and second resistance elements, and an LED. The resistance value of the first resistance element may be set to a value which allows a current smaller than the maximum current value which cannot turn the LED on to flow through the LED when the attachment detection switch is in an OFF state. The resistance values of the first and second resistance elements can be set to values which allow a current larger than the minimum current value which can turn the LED on to flow through the LED when the attachment detection switch is in an ON state. A monitoring circuit may determine whether or not the tongue on the seat is attached to the buckle.

13 Claims, 2 Drawing Sheets

FIG. 1
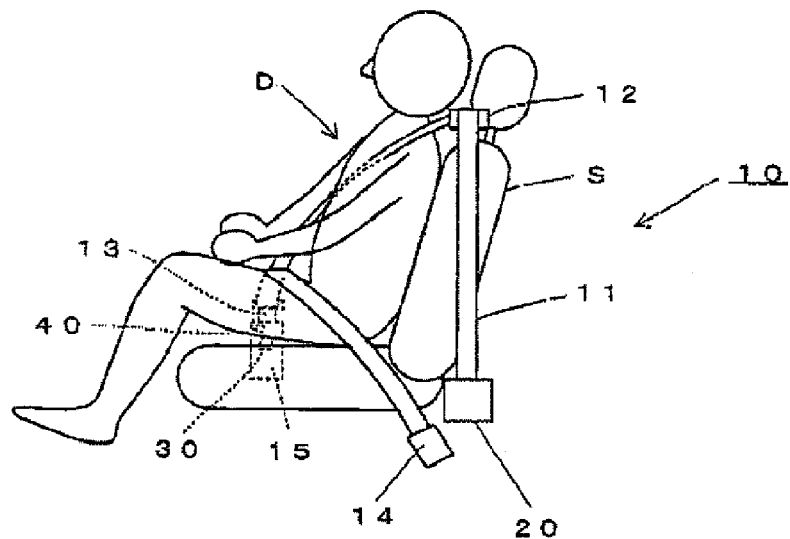
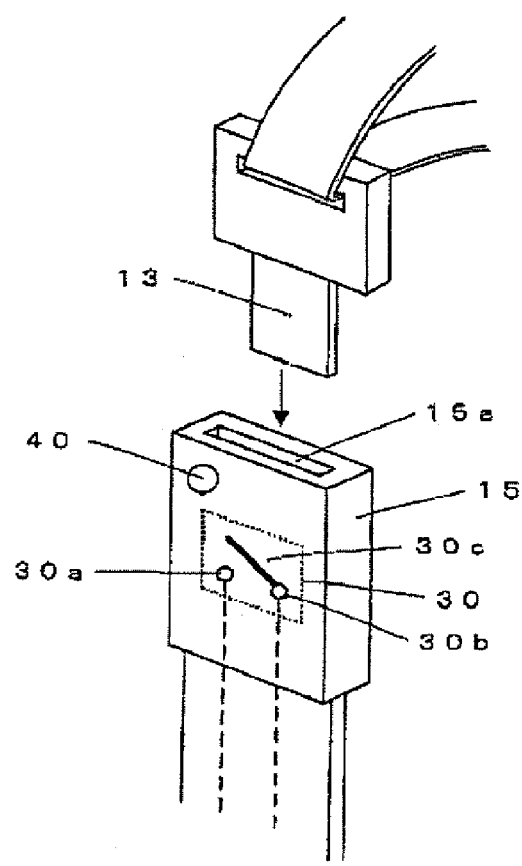
FIG. 2

SEATBELT APPARATUS

BACKGROUND

The present invention relates generally to a seatbelt apparatus mounted to a vehicle and, more specifically, to the detection of whether or not a seatbelt is worn and an improved technique for guiding the fastening of the seatbelt.

A vehicle, such as a motor vehicle, is provided with a seatbelt apparatus for protecting a passenger in case of a vehicle collision. The seatbelt apparatus may include a seatbelt and a spool for feeding and retracting the seatbelt.

In the related art, it is detected whether or not the seatbelt is worn and various controls are performed on the basis of a detected signal indicating whether or not the seatbelt is worn. For example, the seatbelt apparatus may include a motor for driving a spool. The motor is controlled to perform the retraction or feeding of the seatbelt on the basis of the signals indicating whether or not the seatbelt is worn.

A seatbelt apparatus may be provided with a buckle switch which detects a tongue on a seatbelt that is inserted into a buckle or that is pulled out from the buckle, thus detecting whether or not the seatbelt is in a worn state. When a detection signal indicating that the tongue is inserted into the buckle is outputted, a motor is driven in the direction of retracting the seatbelt for eliminating the slack in the seatbelt. When a detection signal indicating that the tongue is pulled out from the buckle is outputted from the buckle switch, the motor is driven in the direction of retracting the seatbelt in order to store the seatbelt.

According to another proposed embodiment, a seatbelt apparatus is provided with an illumination lamp, which illuminates the buckle so that the passenger can wear the seatbelt easily. In this embodiment, the illumination lamp for illuminating the buckle of the seatbelt apparatus is installed in a console box provided on the floor of the cabin at the center. When the passenger opens a vehicle door to enter the vehicle, a detection signal indicating that the vehicle door is opened is supplied to an illumination control unit. Accordingly, the illumination control unit illuminates the illumination lamp. Subsequently, when the passenger inserts the tongue into the buckle, a detection signal indicating that the tongue is inserted into the buckle is supplied to the illumination control unit. Accordingly, the illumination control unit turns the illumination lamp off.

In the seatbelt apparatus shown in Japanese Unexamined Patent Application Publication No. 2004-237827, it is necessary to provide a signal line for outputting a detection signal indicating whether or not the tongue is inserted into the buckle to the illumination control unit and to separately provide a power cable for supplying power to the illumination lamp. In other words, it is necessary to provide a wire harness for the detection signals and a wire harness for the power between the seat (buckle) on which the seatbelt is installed and the illumination control unit.

In vehicles such as a motor vehicle or an airplane, the reduction of the number of wire harnesses is required for reducing the working load and for reducing the cost. In view of such a point, there is a need to provide a technique for effectively reducing the number of the wire harnesses required for detecting whether the seatbelt is worn or not worn and for supplying power to a light-emitting apparatus.

It is to be understood that both the foregoing general description and the following detailed descriptions are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1 shows a schematic structure of a vehicle-mounted seatbelt apparatus according to an embodiment of the present invention.

FIG. 2 shows a schematic structure of a tongue and a buckle according to an embodiment of the present invention.

DESCRIPTION

Figure 3:
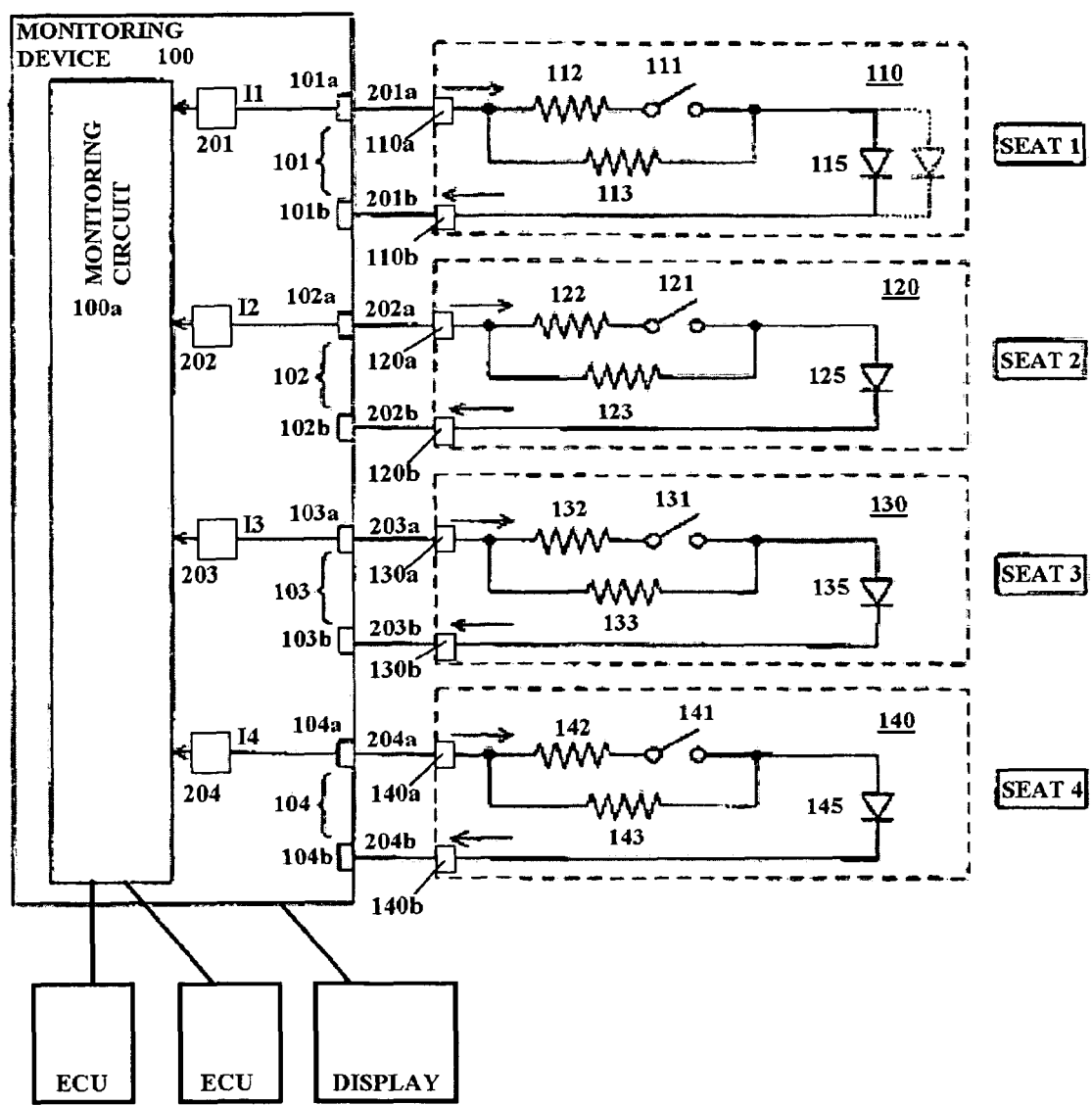
FIG. 3 shows a schematic structure of an electrical system for a vehicle-mounted seatbelt apparatus according to an embodiment of the present invention.

The seatbelt apparatus according to one embodiment may include a seatbelt, a tongue provided on the seatbelt, and a buckle to which the tongue can be attached.

The seatbelt apparatus may further include an attachment detection switch for detecting whether or not the tongue is attached to the buckle, a light-emitting means, a power cable for supplying power to the light-emitting means, and a current adjusting means that is provided between the power cable and the light-emitting means and that can adjust the value of the current which flows in the light-emitting means.

The current adjusting means is adapted to flow current to the light-emitting means at a current value larger than that at which the light-emitting means can emit light when the tongue is not attached to the buckle (when the seatbelt is not worn), and adapted to flow a current to the light-emitting means at a current value smaller than that at which the light-emitting means cannot emit light when the tongue is attached to the buckle (when the seatbelt is worn).

The seatbelt apparatus may be typically applied to the restraint of a passenger seated on a vehicle seat upon collision of the vehicle or the like. However, other vehicles other than motor vehicles may include the seatbelt apparatus of the present disclosure, In regard to the detection method for the attachment detection switch, various detection methods can be employed, such as a mechanical method, an optical method, and a magnetic method.

In regard to the means for outputting a detection signal, a mechanical switch or a semiconductor switch (such as a transistor) can be employed.

An operating mode of the attachment detection switch according to whether or not the tongue is attached to the buckle can be selected as needed. For example, the use of an "opened state" when the tongue is not attached and a "closed state" when it is attached can be employed. Another example may be the use of a "closed state" when the tongue is not attached and an "opened state" when it is attached.

In regard to the light-emitting means, various light-emitting elements or light-emitting devices that can emit light can be employed, such as an LED (light-emitting diode).

A power cable that is connected to a positive terminal and a negative terminal of a DC power source is typically applied. However, in cases where the vehicle body is connected to the negative terminal of the DC power source, the power cable can be connected to the positive terminal of the DC power source and the vehicle body, respectively.

In regard to the power source, a battery mounted to the vehicle or a power source obtained by converting a voltage of the battery to a preset voltage can be employed.

In regard to the current adjusting means, means for adjusting the current flowing in the light-emitting means directly or means for adjusting the current flowing in the light-emitting means by adjusting the voltage to be supplied to the light-emitting means can be employed. The current adjusting means is typically configured by combining the attachment detection switch and a resistance element.

Here, the statement "the current adjusting means is adapted so that a value of the current flowing in the light-emitting means is a larger value than a minimum current value at which the light-emitting means can emit light" indicates that the current adjusting means is adapted so that, for example, when the power voltage is within a preset range, a current of a value larger than a minimum current value at which the light-emitting means can emit light flows in the light-emitting means. For example, a resistance value of the current adjusting means is set.

The statement "the current adjusting means is adapted so that the value of the current flowing in the light-emitting means is a smaller value than a maximum current value at which the light-emitting means cannot emit light" indicates that the current adjusting means is adapted (for example, an impedance of the current adjusting means is set) so that, for example, when the power source voltage is within the preset range, a current of a value smaller than the maximum current value at which the light-emitting means cannot emit light flows in the light-emitting means.

The value larger than the minimum current value at which the light-emitting means can emit light and the value smaller than the maximum current value at which the light-emitting means cannot emit light are determined according to the properties or the like of the power voltage or the light-emitting means.

By configuring the current adjusting means so that a current of a current value other than "0" is flowed in the light-emitting means when the tongue is attached to the buckle (seatbelt is worn), detection whether the seatbelt is worn or not worn, control of the light-emitting means between light-emission and no light-emission, as well as detection of abnormalities, such as a short-circuit or a disconnection of the power cable, can be performed.

An embodiment of the seatbelt apparatus may include a monitoring means for determining whether or not the tongue is attached to the buckle (whether or not the seatbelt is worn) on the basis of a current flowing in the power cable.

The monitoring means may perform various controls on the basis of a determined result; for example, the control of the retraction or feeding of the seatbelt can be performed. Alternatively, the monitoring means may trigger a display means to display the fact that the seatbelt is not worn so that the driver of the vehicle can view it.

The monitoring means may determine that the tongue is not attached to the buckle (a state in which the seatbelt is not worn) when a current value flowing in the power cable is within a first current range and may determine that the tongue is attached to the buckle (a state in which the seatbelt is worn) when it is within a second current range.

For example, the range of the current value at which the light-emitting means can emit the light is employed as the first current range. A range of the current value equal to or larger than a first preset current value which is larger than the minimum current value at which the light-emitting means can emit light (current value≧first preset current value) or a range of the current value between a second preset current value larger than the minimum current value and a third preset current value larger than the second preset current value (third current preset value≧current value≧second current preset value) and the like may be employed as the first current range.

A range of the current value at which the light-emitting means cannot emit light is employed as the second current range. A range of the current value equal to or smaller than a fourth preset current value which is smaller than the maximum current value at which the light-emitting means cannot emit light (current value≦fourth preset current value) or a range of the current value between a fifth preset current value smaller than the maximum current value and a sixth current preset value smaller than the fifth current preset value (fifth current preset value≧current value≧sixth current preset value) may be employed as the second current range. In one embodiment, the current value other than "0" is used as the sixth preset current value.

When the [fifth current preset value≧current value≧sixth current preset value] condition is used as the second current range, the monitoring means determines that an abnormal state, such as a short-circuit or disconnection of the power cable, occurs when the value of a current flowing in the power cable is smaller than the second current range (the current value<sixth current preset value).

Another embodiment of the seatbelt apparatus may include the feature that the attachment detection switch and the resistance element form the current adjusting means. The number of resistance elements that constitutes the current adjusting means may be one or more than one. An element having a resistance component, such as a resistor, may be employed as the resistance element.

In one embodiment, a resistance value of the current adjusting means is set so that the value of a current flowing in the light-emitting means becomes a smaller value than the maximum current value at which the light-emitting means cannot emit light when the attachment detection switch detects that the tongue is attached to the buckle (in an operating state of the attachment detection switch corresponding to the attached state). The resistance value of the current adjusting means is set so that the value of the current flowing in the light-emitting means becomes a value larger than the minimum current value at which the light-emitting means can emit light when the attachment detection switch detects that the tongue is not attached to the buckle (in an operating state of the attachment detection switch corresponding to the not attached state).

In another embodiment of the seatbelt apparatus, the seatbelt, the buckle, the tongue, the attachment detection switch, the light-emitting means, the power cable, and the current adjusting means are provided corresponding to a plurality of seats, respectively. The monitoring means determines whether or not the tongues of the respective seats are attached to their respective buckles (whether or not the seatbelts of the respective seats are worn) on the basis of a current flowing in the power cables corresponding to the respective seats.

The monitoring means may include a control signal to display whether or not the seatbelts of the respective seats are worn on the basis of the determined result, for example, on a display means that a driver of a vehicle can view.

One embodiment of the present invention may include a vehicle that includes the disclosed seatbelt apparatus.

In the seatbelt apparatus of the present disclosure, the current of a current value corresponding to whether or not the tongue is attached to the buckle (whether or not the seatbelt is worn) may flow in the power cable for supplying a power to the light-emitting means. In this embodiment, it is not necessary to provide a specific, wire harness for outputting the detection signal indicating whether or not the tongue is attached to the buckle. Hence, the number of the wire harness in the vehicle can be reduced.

In another embodiment of the seatbelt apparatus, the monitoring means may determine whether or not the tongue is attached to the buckle (whether or not the seatbelt is worn) on the basis of the current value of the power cable for supplying the power to the light-emitting means. In this embodiment, the state in which the seatbelt is worn or not can be determined easily while reducing the number of wire harnesses. Hence, there is a reduction in the work load and the cost.

In another embodiment of the seatbelt apparatus, the current adjusting means can be configured easily and at low cost if the current adjusting means is formed of the attachment detection switch and the resistance element.

In one embodiment of the invention, a small number of wire harnesses can be used to monitor whether or not the tongues provided on the plurality of seats are attached to their respective buckles.

Referring now to the drawings, various embodiments of the present invention will be described below.

As shown in FIG. 1, a seatbelt apparatus 10 of this embodiment is a vehicle seatbelt apparatus which is mounted to a motor vehicle, and mainly includes a seatbelt 11 and a retractor 20. When driving the retractor 20 by a motor, a motor for driving the retractor 20 and an electronic control unit or ECU (control means) for controlling the motor are provided.

The seatbelt 11 is an elongated belt (webbing) used for restraining a passenger D seated on a vehicle seat S to the vehicle seat S.

The seatbelt 11 is withdrawn from the retractor 20 fixed to a vehicle. A midsection of the seatbelt 11 is slidably supported by a shoulder guide anchor 12 provided on an area above the shoulder of the passenger D. The other end of the seatbelt is connected to an out anchor 14. A tongue 13 is provided at a position of the seatbelt 11 between the shoulder guide anchor 12 and the out anchor 14, A buckle 15 is fixed to the vehicle body. By inserting the tongue 13 into an insertion port 15a (see FIG. 2) of the buckle 15, the seatbelt 11 is brought into a state of being worn by the passenger D.

In FIG. 2, a buckle switch 30 for detecting the tongue 13 that is inserted into the insertion port 15a of the buckle 15, i.e., the seatbelt 11 is worn, is provided in the buckle 15.

In FIG. 2, a mechanical switch is used as the buckle switch 30. The buckle switch 30 includes fixed contact points 30a, 30b and a movable contact point 30c. The movable contact point 30c is configured to be capable of moving in a state in which one end thereof is connected to the fixed contact point 30b. The movable contact point 30c is moved by abutment of the tongue 13 inserted into the insertion port 15a of the buckle 15.

In regard to the buckle switch 30, a "B-contact switch" or an "A-contact switch" can be used. A "B-contact switch" is operated in such a manner that the movable contact point 30c is kept apart from the fixed contact point 30a (opened state) when the tongue 13 is not inserted into the insertion port 15a of the buckle 15 (when the seatbelt 11 is not worn), and the movable contact point 30c comes into abutment with the fixed contact point 30a (closed state) when the tongue 13 is inserted into the insertion port 15a of the buckle 15 (when the seatbelt 11 is worn). An "A-contact switch" is operated in such a manner that the movable contact point 30c comes into abutment with the fixed contact point 30a (closed state) when the tongue 13 is not inserted into the insertion port 15a of the buckle 15 and the movable contact point 30c moves apart from the fixed contact point 30a (opened state) when the tongue 13 is inserted into the insertion port 15a of the buckle 15.

The light-emitting means for illuminating the buckle 15 may be provided so that the passenger can insert the tongue 13 into the insertion port 15a of the buckle 15 easily. In such an embodiment, an LED 40 is provided as the light-emitting means in the vicinity of the insertion port 15a of the buckle 15.

Power cables for supplying a power to the LED 40 are provided within a holding means for holding the buckle 15.

A schematic diagram of an electrical system of an embodiment of the seatbelt apparatus is shown in FIG. 3. FIG. 3 shows a case in which seats 1-4 with the seatbelts are provided.

Detection circuits 110, 120, 130, 140 are provided corresponding to the respective seats 1-4. The detection circuits 110, 120, 130, 140 output signals indicating whether or not the tongue is attached to the buckle (whether or not the seatbelt is worn), and operate to turn on or off the light-emitting means according to whether or not the tongue is attached to the buckle. In this embodiment, a current value flowing in the light-emitting means is changed according to the operation of the buckle switch which detects whether or not the tongue is attached to the buckle. The current value flowing in the light-emitting means is used as the signal indicating whether or not the tongue is attached to the buckle.

In this embodiment, the detection circuits 110, 120, 130, 140 are configured as substrates on which electrical parts are disposed and they are mounted in the buckle provided in the respective seats 1-4.

A monitoring device 100 is provided for determining whether or not the tongues of the respective seats 1-4 are attached to the buckles on the basis of the current values flowing in the respective detection circuits 110, 120, 130, 140. The monitoring device 100 is configured as a substrate on which a monitoring circuit 100a (which corresponds to the "monitoring means") is provided.

Power terminals 110a, 110b, 120a, 120b, 130a, 130b, 140a, 140b are provided on the detection circuits 110, 120, 130, 140, and power terminals 101a, 101b, 102a, 102b, 103a 103b, 104a, 104b corresponding to the respective detection circuits 110, 120, 130, 140 are provided in the monitoring device 100.

Since the detection circuits 110, 120, 130, 140 have the same structure, only the detection circuit 110 will be described below. The respective components of the respective detection circuits are represented in such a manner that the reference numerals having the same last digit are similar components.

The detection circuit 110 includes an attachment detection switch 111, resistance elements 112, 113, and an LED (light-emitting means) 115. The attachment detection switch 111 is a switch for detecting the fact that the tongue 13 provided on the seatbelt 11 is attached to the buckle 15. In this embodiment, the buckle switch 30 shown in FIG. 2 is used as the attachment detection switch 111 in FIG. 3. The A-contact point switch is used as the attachment detection switch 111.

The attachment detection switch 111 and the resistance elements 112, 113 may constitute a current adjusting circuit (corresponding to the "current adjusting means" described above). In other words, the current adjusting circuit may be formed of a serial circuit including the attachment detection switch 111 and the resistance element 112 and a parallel circuit of the resistance element 113.

The current adjusting circuit and the LED 115 are then connected in series between the power terminals 110a, 110b.

The LED 115 is a member for illuminating an insertion port of the buckle so that the passenger can attach the tongue easily into the buckle. In one embodiment, it is disposed in the vicinity of the insertion port of the buckle provided on the seatbelt 11 like the LED 40 shown in FIG. 2. A plurality of the LEDs may be provided. For example, another LED can be connected in parallel as shown by a broken line in FIG. 3 such that a plurality of the LEDs can be connected directly.

The power terminals 110a, 110b of the detection circuit 110 are connected to the power terminals 101a, 101b of the monitoring device 100 by power cables 201a, 201b. The power terminals 101a, 101b constitute a terminal set for the detection circuit 110.

The power terminal 101a is connected to a positive terminal of the DC power source of voltage Vc, and the power terminal 101b is connected to an earth terminal GND (or a negative terminal of the DC power source). Accordingly, the direct voltage Vc may be applied between the power terminals 110a, 110b of the monitoring device 100, and as indicated by arrows in FIG. 3, a current flows from the terminal 101a to the terminal 101b via the power cable 201a, the detection circuit 110, and the power cable 201b.

In an embodiment of the seatbelt apparatus, when the tongue is not attached to the buckle, the LED 115 is illuminated to light the insertion port of the buckle and when the tongue is attached to the buckle, the LED 115 is turned off. The monitoring circuit 100a determines whether or not the tongue is attached to the buckle on the basis of the value of the current flowing in the power cables 201a, 201b. In other words, whether or not the tongue is attached to the buckle is determined on the basis of whether the current value flowing in the power cables 201a, 201b is the current value flowing when the LED 115 is in an illuminated state or the current value flowing when the LED 115 is in an OFF state.

As described above, in one embodiment, the current adjusting circuit formed of the attachment detection switch 111 and the resistance elements 112, 113 and the LED 115 are connected in series between the power terminals 110a and 110b. Therefore, the current value flowing in the LED 115 is determined by the direct current voltage Vc between the power terminals 101a, 101b and the resistance values of the current adjusting circuit and the LED 115. Here, the direct current voltage Vc and the resistance values of the LED 115 are fixed. Thus, the current value is determined by the resistance value of the current adjusting circuit.

Therefore, it is necessary to adjust the resistance value of the current adjusting circuit to a resistance value such that the current of a value at which the LED 115 can be illuminated flows to the LED 115 when the tongue is not attached to the buckle and to a resistance value such that the current of a value at which the LED 115 cannot be turned on (turns off) flows to the LED 115 when the tongue is attached to the buckle.

A method of adjusting the resistance value of the current adjusting circuit will be described below.

The attachment detection switch 111 provided in the detection circuit 110 shown in FIG. 3 is in the ON state (closed state) when the tongue is not attached to the buckle. At this time, the current adjustment circuit is formed of the parallel circuit of the resistance elements 112, 113. Therefore, a combined resistance value of the parallel circuit of the resistance elements 112, 113 is set to a resistance value such that a current of a value (for example, a rated current 20 mA) at which the LED 115 can turn on flows in a state in which the DC power source of the voltage Vc is applied between the power terminals 110a and 110b.

In a motor vehicle or the like, the voltage of the DC power source in the vehicle may vary according to the traveling state. For example, in the case of a 12V system, it may vary within a range from 12V to 14V according to the traveling state. Therefore, when employing the DC power source in the vehicle as the DC power source, the resistance values of the resistance elements 112, 113 are set so that a current of a value that ensures turning on of the LED 115 flows in the LED 115 (within the range that does not exceed the rated current) even when the direct current voltage Vc is varied.

The attachment detection switch 111 is in the OFF state (opened state) when the tongue is attached to the buckle. At this time, the current adjusting circuit is configured by the resistance element 113. Therefore, the resistance value of the resistance element 113 is set to a resistance value such that a current of a value at which the LED 115 cannot be turned on (for example, a current on the order of 7 mA when the rated current is 20 mA) flows in a state in which a DC power source of the direct current voltage Vc is applied between the power terminals 110a and 110b.

At this time, when the DC power source in the vehicle is used as the DC power source, the resistance value of the resistance element 113 is set to a value so that the current of a value that ensures turning off of the LED 115 flows in the LED 115 even when the voltage Vc is varied.

By setting the resistance value of the current adjusting circuit (the resistance value of the resistance element 113 in FIG. 3) so that the value of the current flowing in the LED 115 becomes a minute value (for example, "0") when the attachment detection switch 111 is in the OFF state, it cannot be determined whether the attachment detection switch 111 is in the OFF state or an abnormality in the power cables 201a or 201b exists, such as a short-circuit or disconnection. Therefore, in one embodiment, the resistance value of the current adjusting circuit is set to a value so that the value of the current flowing in the LED 115 becomes a value other than "0" (for example, several mA) when the attachment detection switch 111 is in the OFF state.

A current of a value corresponding to the value of the current flowing in the LED 115 flows in the power cables 201a, 201b. Therefore, in order to determine whether the attachment detection switch 111 is in the ON state or in the OFF state (that is, whether or not the tongue is attached to the buckle), a current detector 201 is provided on the monitoring device 100 between the terminal 110a and the positive terminal of the DC power source. A current value I1 corresponding to the value of the current flowing in the LED 115 of the detection circuit 110 is detected by the current detector 201.

The current value I1 detected by the current detector 201 is supplied to the monitoring circuit 100a. When the detected current value I1 that is detected by the current detector 201 is within a first current range, the monitoring circuit 100a determines that the tongue is not attached to the buckle in the seat 1, and when the detected current value I1 is within a second current range, the monitoring circuit 100a determines that the tongue is attached to the buckle in the seat 1.

The first current range is set according to the current value determined by the resistance value of the current adjusting circuit when the attachment detection switch 111 is in the ON state. The first current range may be equal to or larger than a first preset current value larger than the minimum current value that can turn the LED 115 on (current value≧first preset current value) or a range between a second preset current value larger than the minimum current value which can turn the LED 115 on and a third preset current value larger than the second preset current value (third preset current value≧current value≧second preset current value).

The second current range is set according to the current value determined by the resistance value of the current adjusting circuit when the attachment detection switch 111 is in the OFF state. The second current range may be a value equal to or smaller than a fourth preset current value which is smaller than the maximum current value which cannot turn the LED 115 on (current value≦fourth preset current value), or a range between a fifth preset current value which is smaller than the maximum current value that cannot turn the LED 115 on and a sixth current preset value smaller than the fifth current preset value (fifth preset current value≧current value≧sixth preset current value). A value other than "0" may be set as the sixth preset current value.

In a case of enabling the determination of an occurrence of an abnormality on the power cables 201a or 201b, such as a short-circuit or a disconnection, based on the value of current flowing in the power cable, the range [fifth preset current value≧current value≧sixth preset current value] is used as the second current range. In such an embodiment, the monitoring circuit 100a determines that an abnormality, such as short-circuit or disconnection, occurs in the power cable 201a or 201b by the fact that the detection current value I1 detected by the current detector 201 is smaller than the second current range (current value<sixth preset current value).

In the detection circuits 120, 130, 140, when the tongues provided in the seats 2, 3, 4 are not attached to the buckles (when the seatbelts are not worn), LEDs 125, 135, 145 are turned on, and when the tongues are attached to the buckles (when the seatbelts are worn), the LEDs 125, 135 and 145 are turned off.

When detection current values I2, I3, I4 detected by current detectors 202, 203, 204 are within the first current range using the same method as the method described above, the monitoring circuit 100a determines that the tongues are not attached to the buckles in the seats 2, 3, 4 (the seatbelts are not worn). Conversely, when the detection current values I2,I3, I4 are in the second current range, the tongues are attached to the buckles in the seats 2, 3, 4 (the seatbelts are worn).

It is also possible to configure to start the supply of the DC power source to the power cables connected to the respective detection circuits 110, 120, 130, 140 from the monitoring circuit 100a when predetermined conditions are satisfied. For example, it may be configured so that the supply of the DC power source is started under a condition that the vehicle door is opened and a door switch is operated. In such a case, it may also be configured so as to start supplying the DC power source to the detection circuit of the seat corresponding to the opened door. Alternatively, the supply of the DC power source can be started under a condition that an ignition key is turned on. It is also possible to configure the system to stop the supply of the DC power source from the monitoring circuit 100a to the detection circuit when the fact that the tongue is attached to the buckle is not detected after the door is opened or even after a certain period of time has elapsed after the ignition key is turned on (when the detection current value does not fall within the second current range).

It is also possible to configure in such a manner that the monitoring circuit 100a performs various controls on the basis of the result of the determination of whether or not the tongues of the respective seats are attached to the buckles. For example, retracting or feeding of the seatbelt is controlled by controlling a motor that drives a retractor.

It is also possible to output the result of the determination of whether or not the tongues of the respective seats are attached to the buckles from the monitoring circuit 100a to other control circuits, for example, various ECUs provided in the vehicle, as seen in FIG. 3.

The monitoring means may include a control signal to display whether or not the seatbelts of the respective seats are worn on the basis of the determined result, for example, on a display means that a driver of a vehicle can view. For example, FIG. 3 shows a display for displaying the fact that the seatbelt is not worn based on the output from the monitoring device 100.

As described above, the detection of whether or not the tongue provided on the seat is attached to the buckle and the supply of the power to the light-emitting means for performing illumination so that the passenger can attach the tongue to the buckle easily can be achieved by a common power cable. Therefore, the number of the wire harnesses can be reduced. Thus, the working load and the cost can be reduced as a result.

The present invention is not limited to the structure described in the various embodiments, and various modifications, additions and deletions are possible.

For example, although the mechanical switch is employed as the attachment detection switch for detecting whether or not the tongue is attached to the buckle (whether or not the seatbelt is worn), the attachment detection switch is not limited to the mechanical type. A switch of various types, such as an optical type or a magnetic type, can be used. The output means for outputting the detection signal is not limited to the mechanical contact point; for example, a semiconductor element can be used.

Although the LED is used as the light-emitting means, the light-emitting means is not limited to the LED. Various light-emitting elements or light-emitting devices can be used.

Although the light-emitting means is arranged at a position in the vicinity of the insertion port of the buckle, the light-emitting means may be arranged at other positions of the buckle. The light-emitting means may also be arranged via an auxiliary member. Alternatively, the light-emitting means may be arranged at a position other than the buckle.

The light-emitting means is not limited to one light-emitting means but a plurality of light-emitting means may be provided. When a plurality of light-emitting means is provided, a mode of connecting the light-emitting means in series or a mode connecting the same in parallel may be used.

Although the current adjusting means employed above comprises a combination of an attachment detection switch and a resistance element, the current adjusting means of various structures can also be employed as the current adjusting means.

Although the power source may be supplied from the monitoring device to the respective detection circuits, the method of supplying the power source to the respective detection circuits are not limited thereto as long as the monitoring circuit detects the current value flowing in the respective detection circuits.

Although the current detectors may be provided in their respective detection circuits, it is also possible to use a method of detecting the current value of the respective detection circuit by connecting a common current detector to the respective detection circuits in sequence.

Although the light-emitting means for performing illumination so that the passenger can easily attach the tongue to the buckle has been described, an embodiment of present invention can be applied to light-emitting means used anywhere in conjunction with the seatbelt.

An embodiment of the present invention can be configured as a seatbelt apparatus that only has the detection circuit.

Although the seatbelt apparatus mounted to the motor vehicle has been described, the seatbelt apparatus can be used for various other vehicles, such as an airplane.

The priority application Japanese Patent Application No. 2005-064530, filed Mar. 8, 2005 is incorporated by reference herein.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seatbelt apparatus comprising:
   a tongue;
   a buckle to which the tongue is configured to be attached;
   a light-emitting element;
   a power cable for supplying power to the light-emitting element; and
   a current adjuster that is provided between the power cable and the light-emitting element,
   wherein the current adjuster is configured to allow a current to flow to the light-emitting element at a value larger than a minimum current value at which the light-emitting element can emit light when the tongue is not attached to the buckle, and
   wherein the current adjuster is configured to allow a current to flow to the light-emitting element at a value smaller than a maximum current value at which the light-emitting element cannot emit light when the tongue is attached to the buckle.

2. The seatbelt apparatus according to claim 1, further comprising a monitoring device for determining whether or not the tongue is attached to the buckle on the basis of a current flowing in the power cable.

3. The seatbelt apparatus according to claim 2, wherein the monitoring device is configured to determine that the tongue is not attached to the buckle when a current value flowing in the power cable is within a first current range, and
   wherein the monitoring device is configured to determine that the tongue is attached to the buckle when a current value flowing in the power cable is within a second current range.

4. The seatbelt apparatus according to claim 1, wherein the current adjuster comprises an attachment detection switch for detecting whether or not the tongue is attached to the buckle.

5. The seatbelt apparatus according to claim 4, wherein the current adjuster further comprises at least one resistance element.

6. The seatbelt apparatus according to claim 1, wherein the light-emitting element is a light-emitting diode.

7. A seatbelt apparatus comprising:
   a tongue;
   a buckle to which the tongue is configured to be attached;
   a current adjuster comprising an attachment detection switch for detecting whether or not the tongue is attached to the buckle; and
   a power cable associated with the current adjuster,
   wherein the current adjuster is configured to allow a current having a value in a first range to flow to the power cable when the tongue is not attached to the buckle, and
   wherein the current adjuster is configured to allow a current having a value in a second range to flow to the power cable when the tongue is attached to the buckle.

8. The seatbelt apparatus according to claim 7, further comprising a monitoring device for determining whether or not the tongue is attached to the buckle on the basis of a current flowing in the power cable.

9. The seatbelt apparatus according to claim 8, further comprising a display for displaying the fact that a seatbelt is not worn based on output from the monitoring device.

10. The seatbelt apparatus according to claim 8, further comprising an electronic control unit that receives output from the monitoring device.

11. The seatbelt apparatus according to claim 7, further comprising at least one light-emitter associated with the current adjuster, and
    wherein the current adjuster is configured to adjust a value of a current which flows in the at least one light-emitter.

12. The seatbelt apparatus according to claim 11, wherein the at least one light-emitter is a plurality of light-emitting diodes.

13. A vehicle comprising:
    a plurality of seats;
    a seatbelt apparatus corresponding to each seat in the plurality of seats,
    wherein each seatbelt apparatus comprises:
      a tongue;
      a buckle to which the tongue is configured to be attached;
      a power cable; and
      a current adjuster associated with the power cable, wherein the current adjuster comprises an attachment detection switch, wherein the current adjuster is configured to allow a current having a value in a first range to flow to the power cable when the tongue is not attached to the buckle, and wherein the current adjuster is configured to allow a current having a value in a second range to flow to the power cable when the tongue is attached to the buckle; and
    a monitoring device for determining whether or not the tongues of the respective seatbelt apparatuses are attached to their corresponding buckles on the basis of a current flowing in the power cables corresponding to their respective seatbelt apparatuses.

* * * * *